Figure 4:
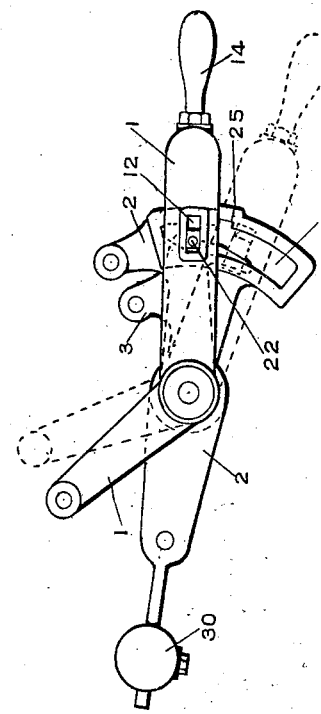

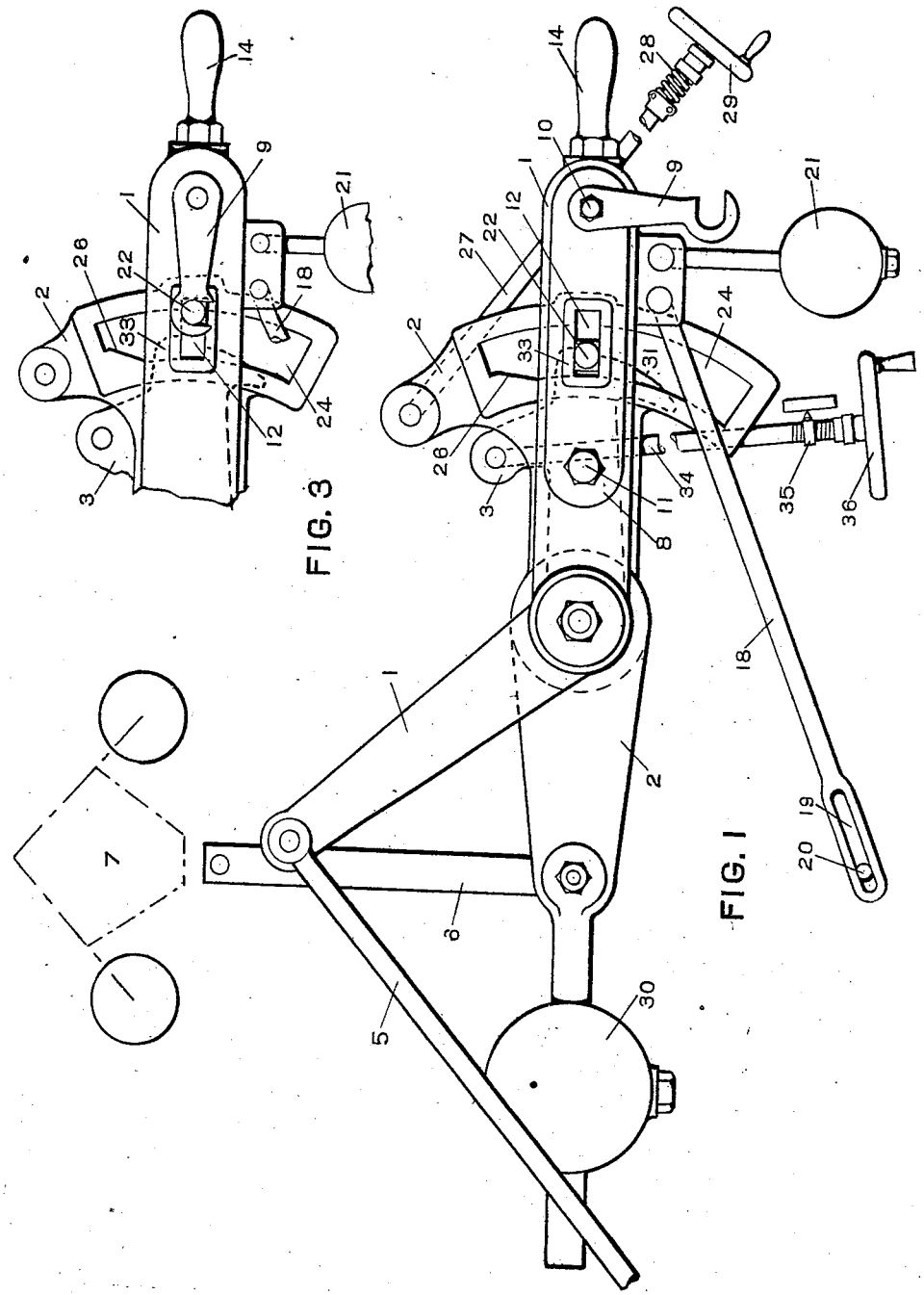

No. 863,117. PATENTED AUG. 13, 1907.
J. TRIBE.
REGULATOR AND SAFETY STOP.
APPLICATION FILED SEPT. 30, 1905.

4 SHEETS—SHEET 2.

WITNESSES:
Jno M France
Geo E Kirk

James Tribe INVENTOR
BY
G. J. DeW____ ATTORNEY.

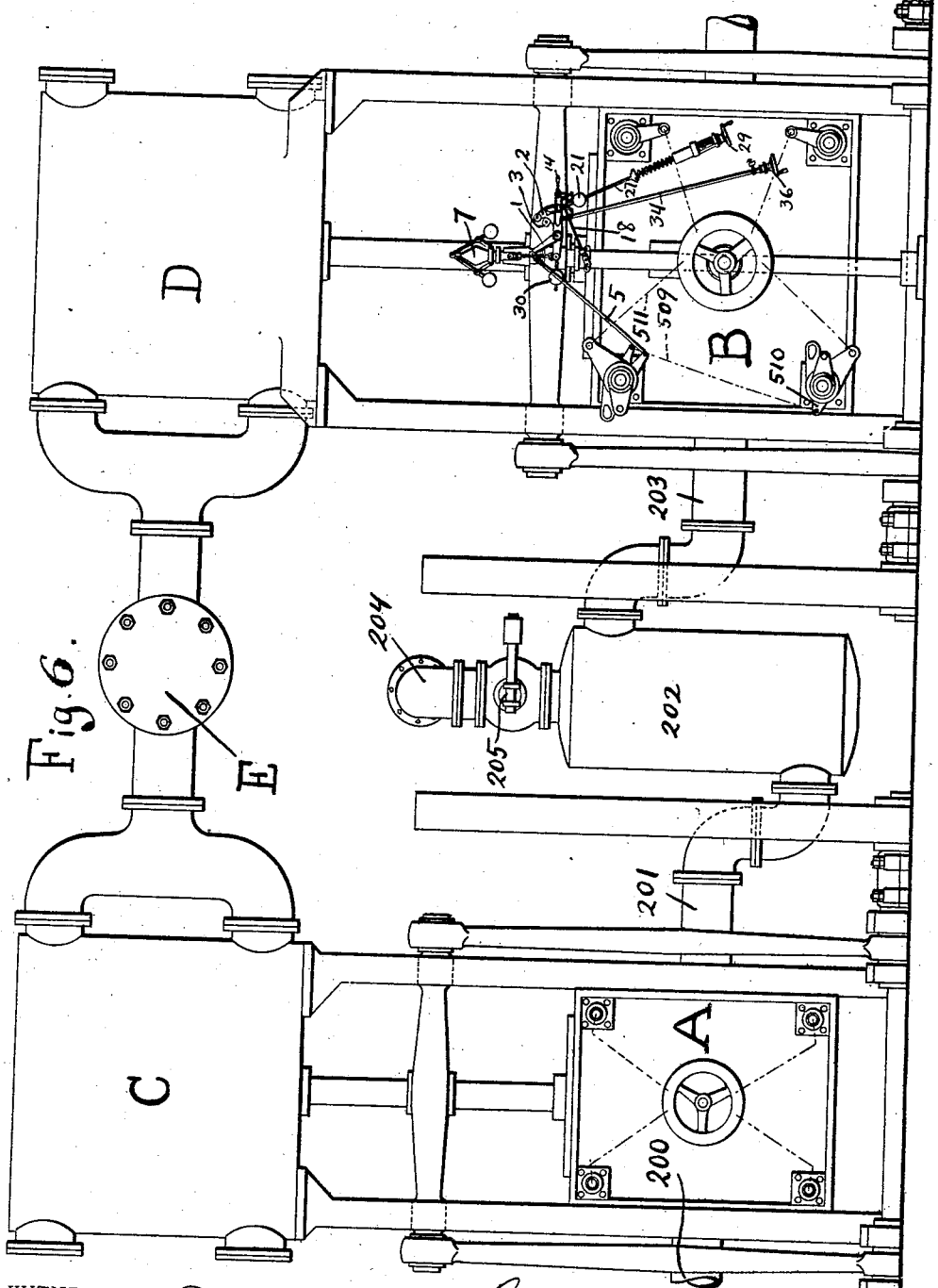

No. 863,117. PATENTED AUG. 13, 1907.
J. TRIBE.
REGULATOR AND SAFETY STOP.
APPLICATION FILED SEPT. 30, 1905.
4 SHEETS—SHEET 4.
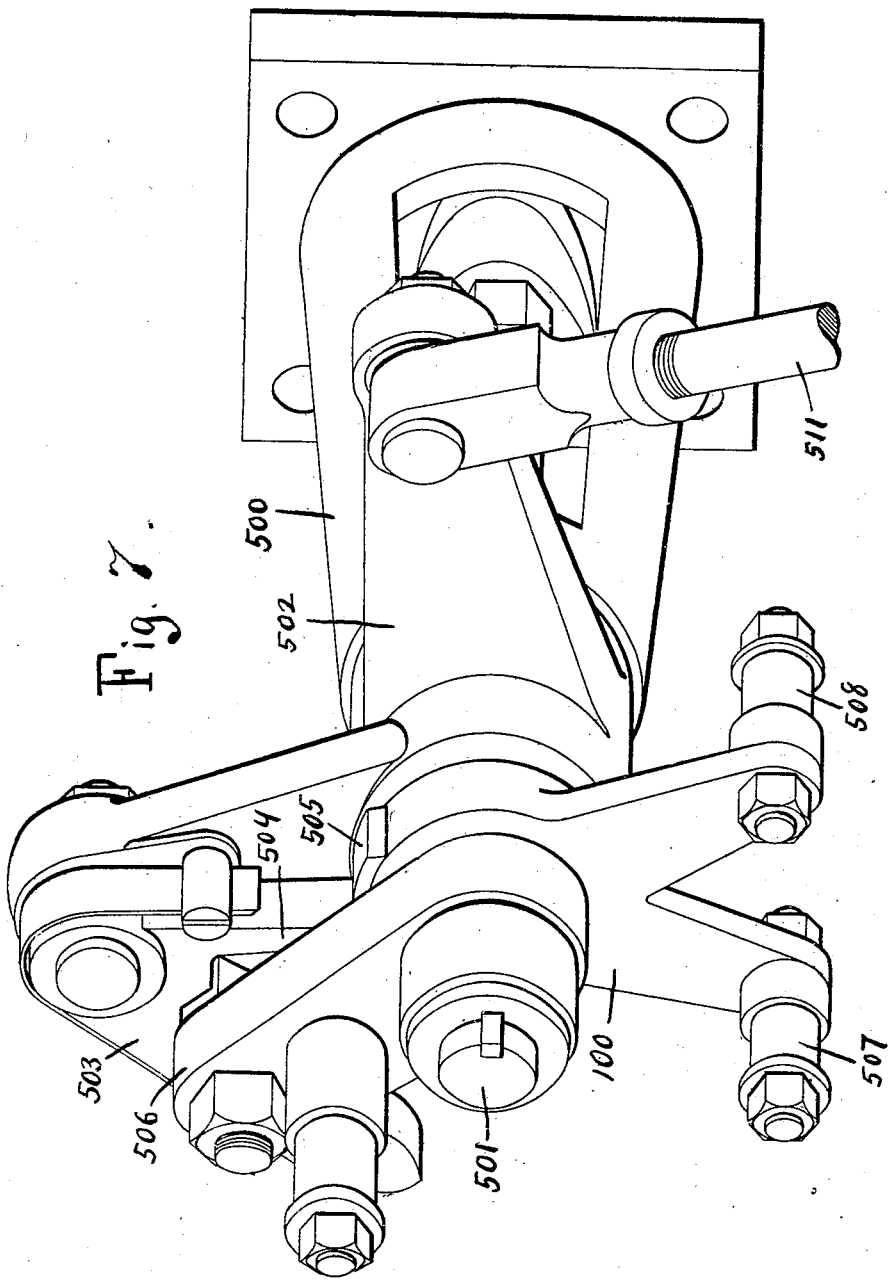
WITNESSES:
Frank E. Dennett
John C. Rennie
James Tribe INVENTOR
BY
ATTORNEY.

UNITED STATES PATENT OFFICE.

JAMES TRIBE, OF MILWAUKEE, WISCONSIN, ASSIGNOR TO ALLIS-CHALMERS COMPANY, OF MILWAUKEE, WISCONSIN, A CORPORATION OF NEW JERSEY.

REGULATOR AND SAFETY STOP.

No. 863,117.   Specification of Letters Patent.   Patented Aug. 13, 1907.

Application filed September 30, 1905. Serial No. 280,786.

*To all whom it may concern:*

Be it known that I, JAMES TRIBE, a citizen of the United States, residing at Milwaukee, in the county of Milwaukee and State of Wisconsin, have invented certain new and useful Improvements in Regulators and Safety-Stops, of which the following is a specification.

This invention relates to mechanism for regulating a machine or steam engine as the result of the shifting of a member. The shifting of the member may be accomplished by hand or automatically and with the specific apparatus disclosed by this specification, provision is also made to permit the shifting of the member to throw the machine or engine out of operation.

The specific embodiment of this invention disclosed by this specification comprises a centrifugal governor or its equivalent combined with the cams of the steam valves of the steam engine for varying the cutoff as the speed of the engine varies, the same apparatus being adapted to be set by hand so as to maintain the cutoff fixed, regardless of the speed of the engine, the governor however being adapted to operate a trip device at an excessive speed whereby the steam valves are allowed to close and to remain closed, thus cutting the engine or machine out of service.

It has been found in operating blowing engines for example, that it is desirable to use a high pressure engine for operating one blower and an independent low pressure engine operated by the steam exhausted from the high pressure engine for operating a second blower, the blowers being united to a common delivery pipe or trunk.

By using separate engines combined in the manner stated, considerable economy in the operation of the blowing engine plant is realized, but there are many exigencies which are encountered by a blowing engine plant which render it desirable to regulate the capacity of a part of the plant according to conditions which may exist or which may suddenly arise. For example, it may be desired to use both high and low pressure engines running at full speed as two simple engines receiving steam at substantially the same pressure, either from the same or different sources of supply while guarding against the engines running away if an air pipe burst or the air pressure should suddenly fall from some cause. On the drawings forming a part of this specification, the high pressure engine being of an ordinary type, has been shown merely conventionally and stripped of all details which would tend to confuse the general arrangement of the apparatus. This high pressure engine is provided in practice with any preferred form of governor and will, therefore, not run away if the air pressure decreases. The low pressure engine shown by the drawings will not run away while the cutoff cams are being controlled by the governor. If, however, these cutoff cams were set to a fixed cutoff point by the hand lever, it would then be possible for the engine to run away. Such an accident however is avoided by the apparatus disclosed by this specification.

It is of course understood that in the actual use of blowing engines with steam connections as shown by the drawings, by-pass pipes are commonly provided by which, as an emergency measure, steam may be directly admitted at boiler pressure to the low pressure engine, and it is when steam is thus admitted to the low pressure engine direct from the boiler that it is desirable to use the centrifugal governor for controlling the low pressure engine, but when the low pressure engine is used compounded with the high pressure engine, as illustrated by the drawings, then it is found desirable to adjust the cut-off of the low pressure engine by hand to a point where it is found that the operation of the engine is satisfactory. And it is under this condition of running, which is shown by the drawings, that the governor acts the part of a safety device in case the engine should start to run away.

The specific mechanism disclosed by this specification for effecting the results stated comprises a pivoted handle, arm or member which is connected with the cutoff cams by reach rods, whereby the position of said cams may be adjusted by moving said arm, a pivoted lever adapted to be actuated by a centrifugal governor, being so located with respect to said arm that it may be locked to said arm, whereby said arm will partake of its movements, said arm being provided with a catch to engage with a fixed support to retain said cutoff cams in a predetermined position, said catch, however, being adapted to be engaged by the lever connected with the governor when the governor assumes an extreme position, means being provided to cause said arm when said catch is released to assume an extreme position so that no steam will be admitted to the engine.

Accordingly this device supplies a ready means for changing two simple engines to run compound so to speak, and also has the further provision of a safety stop. These features are embodied in a compact structure having a minimum number of parts.

Figure 5:
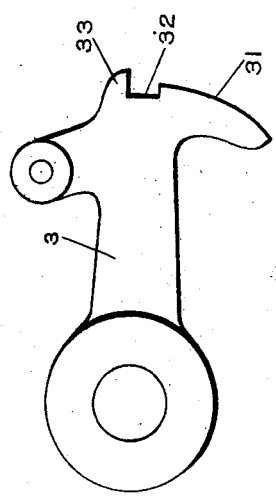
Figure 2:
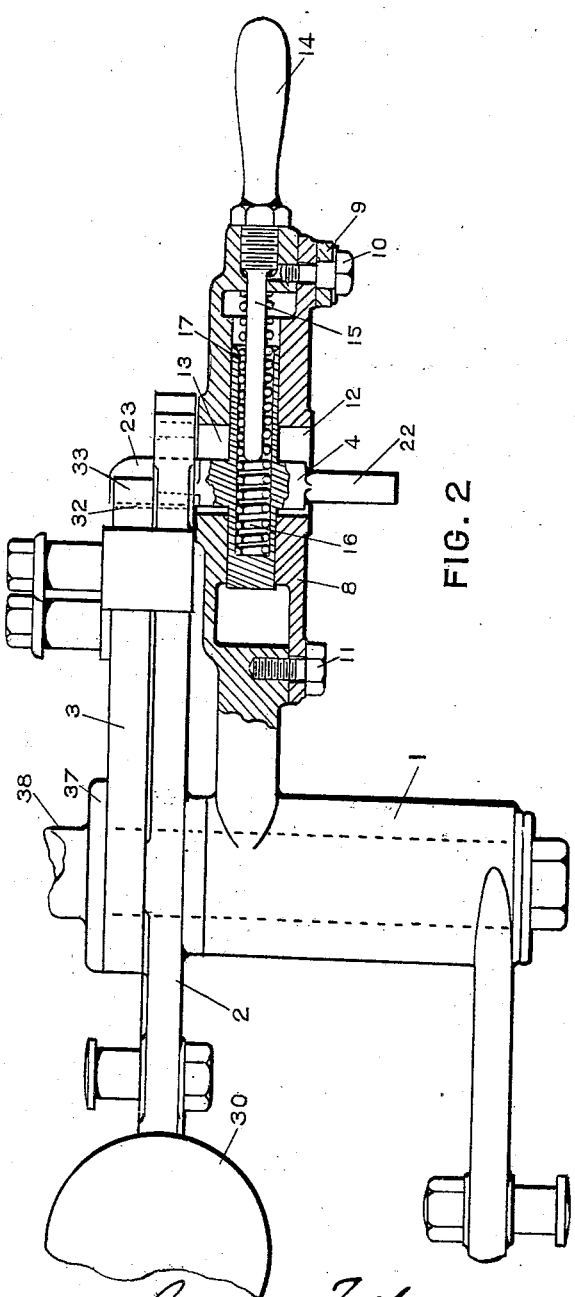

Referring to the drawings,—Figure 1 is a side elevation of the device. Fig. 2 is a plan view thereof partially in section. Fig. 3 is a fragmentary elevation showing position of the parts when connected up for regulator control. Fig. 4 is an elevation showing position of the parts at the regulator release stage with a dotted line showing the position of the control arm after such release has taken place. Fig. 5 is an elevation of the adjustable holding arm. Fig. 6 is an elevation of two blowing engines with this improved regulator applied to a low pressure cylinder. Fig. 7 is a perspective of one of the steam valve bonnets and associated parts of the low pressure engine.

The pivoted control arm 1 is of bell crank form and has mounted adjacent thereto a second arm 2, which is pivoted and adjustable. A third pivoted arm 3 is mounted adjacent the other arms and is also adjustable. Serving to connect the arms is a sliding element 4, cross-shape in form.

Connected to an extension of the arm 1 is a link or reach-rod 5 which extends to the mechanism to be controlled cam member 100, which is the ordinary form of knock-off cam member extensively in use with Corliss engines and adapted to change the cutoff of the steam valves.

The arm 2 is a regulator actuated member, the operation of which arm being effected through a link 6 from a regulator, as a ball governor 7, diagrammatically shown. In the instance herein illustrated, this regulator will be speed actuated.

The arm 1 has a recessed extension covered by the plate 8. Mounted on this plate is the latch 9. The bolt 10 serves to hold the latch 9 and plate 8 in position at one end on the arm 1, while the bolt 11 holds the other end of the plate 8 in position. The plate 8 has a slot 12. Opposed to this slot 12 is the slot 13 in the arm 1. These slots are connected to the recess in the arm 1, in which recess is the element 4. A handle 14 has an extension 15 which enters the recess in the arm 1, the extension serving as a guide for the spring 16 which enters the recess 17 in the element 4.

In the operation of the device, arm 1 is formed to have but a limited movement. This may be determined by a pin against which the arm could trip directly, or, as shown in the drawing, by a link 18 having a slot 19, in which slot is the pin 20. The limited space available on the drawing has made it necessary to show this link at a much less angle to the arm 1 than is used in practice.

The arm 1 when free, is designed to stop the engine. This can be brought about by having it drop. To accomplish this result, a weight 21 is appended thereto.

The element 4 mounted to slide in the arm 1 has, extending through slot 12, an extension 22 which can be used as a handle in pulling the element 4 over to have it engaged by the latch 9. Opposite the extension 22, the element 4 has a second extension 23 extending through the slot 13. This extension 23 also extends through the arc-shaped slot 24 in the member 2. This slot has a notch 25 into which extension or catch 23 extends to lock the member 2 into engagement with the arm 1 when the latch 9 holds the extension 22, as shown in Fig. 3. When in this position, movement of the control arm is effected solely by the regulator. The slot 24 has a bevel or cam 26.

Connected to the member 2 is a link 27 which, through a spring 28 and a hand wheel 29 properly mounted, serves as a means for varying the resistance to movement of the member 2. This link 27 with the spring 28 serves as a loading device for the governor by which the speed of the engine may be varied without disturbing the adjustment of the governor balls. The effect of this is to vary the speed at which the governor or regulator will actuate the member 2.

Near the opposite end of the member 2 is an adjustable weight 30 to counterbalance the parts. This weight may also serve as a means for effecting the operation of regulation.

The arm 3 has a cam surface 31 so curved that in the mounting of the arm 3 adjacent the member 2, this surface 31 will curve back of the edge of the slot 24. The other end of this surface terminates at a notch 32 in the arm 3, (see Fig. 5). The further side 33 of this notch 32 is sufficiently high that it will not permit the element 4, in traveling up the slot 24, to get by.

Connected to the arm 3 is the link 34 having the indicator 35. This link 34 is operated by hand wheel 36 to adjust the position of the arm 3. When connected to a valve, the indicator 35 may show the position of trip between full stroke and point of opening.

The arms 1, 2 and 3 are mounted adjacent each other. A collar 37 on the shaft 38 abuts arm 3. The shaft 38 supports the arms.

Referring to Figs. 6 and 7 of the drawing A designates a high pressure steam engine supplied with steam by the steam pipe 200 and also provided with the exhaust pipe 201 in connection with the receiver 202 which in turn communicates with what may be termed the low pressure engine B by means of the steam pipe 203 or with the atmosphere or a condenser, as the case may be, by means of the pipe 204 the thoroughfare through which pipe is controlled by any preferred type of back pressure valve 205.

The operation of the device is as follows: The weight 30 on the member 2 is set so that the spring 28 is neutral, that is, neither in compression or tension. This member 2 if connected up with arm 1, as shown in Fig. 3, would permit of the valve gear trip being controlled directly by the regulator, which would be the manner used if the engine were run independently as a simple engine. For operation with hand adjustment, which is desirable if the engine is to be run compound with a second high pressure engine, the arm 1 is connected with the arm 3, as shown in Fig. 1, the spring 16 serving to hold the element 4 in this locking position. When so connected up, rotation of the hand wheel 36 can be had until the trip occurs as desired. If, in the continued operation, the engine should speed up, the regulator would tilt the arm 2, as shown in Fig. 4, causing the cam 26 to force the element 4 out of the notch 32 in the arm 3, thus permitting the weight 21 to cause the arm 1 to drop and thereby trip the valve before steam enters. This drop position of the arm 1 is shown in dotted lines in Fig. 4. When this safety stop has taken place, all that is necessary to bring the device to operate as before is to pull up on the handle 14, whereby the element 4 will ride up on the cam 31 into engagement with the notch 32 of the arm 3. By grasping the extension 22 of the element 4, this element may be readily operated against resistance of the spring 16 over into engagement with the notch 25 of the member 2 and locked in this position by the latch 9. This is a most ready and convenient means for changing the regulator to actuate the control arm.

From the foregoing description and the drawing it will be very apparent that when the governor lever 2 is locked to the arm on member 1 by the catch 22, being engaged in the notch 25 and retained therein by the latch 9, all variations of speed experienced by the governor will affect the cam members which determine the point of cutoff of the steam valves and the low pressure engine will be completely under the control of the governor.

What is claimed and it is desired to secure by Letters Patent is,—

1. The combination with an arm adapted to be connected to valve controlling mechanism, said arm being pivotally supported, of a second arm pivotally supported and located adjacent to said first mentioned arm, means for adjusting said second arm, and means for locking said arms together.

2. The combination with an engine and its valve controlling mechanism of an arm adapted to be connected to the valve controlling mechanism, said arm being pivotally supported, a second arm pivotally supported and located adjacent to said first mentioned arm, means for adjusting said second arm, means for locking said arms together, a governor responsive to the speeds of the engine, and means operated by said governor for disengaging the locking means from one of said arms.

3. The combination with an engine including its valve mechanism, of an arm pivotally supported and adapted to control the valve mechanism of said engine, an adjustable arm pivotally supported adjacent said first mentioned arm, means for adjusting said arm, a third arm pivotally supported adjacent said first mentioned arms, a governor responsive to the speeds of the engine connected with said last mentioned arm, and means for locking said first two mentioned arms together said last mentioned arm being adapted to disengage said locking means from one of the first two mentioned arms.

4. The combination with an engine including its valve mechanism, of a pivotally supported arm connected with said valve mechanism, a second arm pivotally supported adjacent said first mentioned arm, means for adjusting said last mentioned arm to different angular positions about its support, a third arm pivotally supported adjacent said first two mentioned arms, a governor responsive to the speeds of the engine connected to said last mentioned arm, and means for locking said first mentioned arm to either one of the others of said arms.

5. The combination with an engine including its valve mechanism, of a pivotally supported arm connected with said valve mechanism, a second arm pivotally supported adjacent said first mentioned arm, means for adjusting said last mentioned arm to different angular positions about its support, a third arm pivotally supported adjacent said first two mentioned arms, a governor responsive to the speeds of the engine connected to said last mentioned arm, and means for locking said first mentioned arm to either of the other of said arms, said governor connected arm being adapted to disengage said locking means from one of the other two arms at an extreme position of said governor arm.

6. The combination with an engine and its valve mechanism including cut-off cam members, of a pivoted arm connected to said cam members for varying the point of cut-off, a second arm pivotally supported adjacent said first mentioned arm and provided with a notch, means for adjusting the position of said last mentioned arm, a spring actuated catch carried by said first mentioned arm, a third arm pivotally mounted adjacent the first two mentioned arms, a governor responsive to the speeds of the engine connected to said third arm said third arm also being provided with a notch, the spring actuated catch carried by said first mentioned arm being adapted to engage either within the notch in said second mentioned arm or within the notch in said governor actuated arm to lock said first mentioned arm to either of the other two arms.

7. The combination with an engine and its valve mechanism including cut-off cam members, of a pivoted arm connected to said cam members for varying the point of cut-off, a second arm pivotally supported adjacent said first mentioned arm and provided with a notch, means for adjusting the position of said last mentioned arm, a spring actuated catch carried by said first mentioned arm, a third arm pivotally mounted adjacent the first two mentioned arms, a governor responsive to the speeds of the engine connected to said third arm, said third arm also being provided with a notch, the spring actuated catch carried by said first mentioned arm, being adapted to engage either within the notch in said second mentioned arm or within the notch in said governor actuated arm to lock said first mentioned arm to either of the other two arms, and a latch for holding said catch in engagement with the notch in one of said arms against the action of the spring.

8. The combination with an engine including its valve mechanism, of a pivotally supported arm connected with said valve mechanism, a second arm pivotally supported adjacent said first mentioned arm, means for adjusting said last mentioned arm to different angular positions about its support, a third arm pivotally supported adjacent said first two mentioned arms, a governor responsive to the speeds of the engine connected to said last mentioned arm, means for locking said first mentioned arm to either of the other of said arms, said governor connected arm being adapted to disengage said locking means from one of the other two arms at an extreme position of said governor arm, and means for causing said first mentioned arm to swing about its support when disengaged from said second mentioned arm.

9. The combination with an engine including its valve mechanism, of a pivotally supported arm connected with said valve mechanism, a second arm pivotally supported adjacent said first mentioned arm, means for adjusting said last mentioned arm to different angular positions about its support, a third arm pivotally supported adjacent said first two mentioned arms, a governor responsive to the speeds of the engine connected to said last mentioned arm, means for locking said first mentioned arm to either of the other of said arms, said governor connected arm being adapted to disengage said locking means from one of the other two arms at an extreme position of said governor arm, means for causing said first mentioned arm to swing about its support when disengaged from said mentioned arm, and means to stop said arm after it has swung through a predetermined distance.

10. The control arm, an adjustable arm connected to hold the first arm, and a regulator actuated member operative to release the control arm.

11. A pivoted arm, a second arm connected to hold the first arm, a regulator actuated member operative to release the first arm, and adjusting means connected to said member.

12. A pivoted arm, a yieldingly actuated element carried thereby, and a second arm having a cam surface and a notch whereby relative movement of the arms may guide the element to lock the arms together.

13. A control arm, a second arm, an automatically operative member, and means for connecting said control arm to the second arm or to the member, said member also having means for disconnecting the arms.

14. A pair of arms, an element for connecting said arms, and a regulator actuated member having means for moving the element to disconnect the arms, said member also having means whereby the member and an arm may be connected by the element.

15. A control arm, an adjustable arm, an automatically operative arm and means whereby the first and third arms, or the first and second arms, may be connected, the third arm having means for disconnecting the other two.

16. The combination with a blowing engine adapted to receive steam from a source of supply, of a second blowing engine adapted to be operated by the exhaust steam from said first mentioned engine, said second mentioned blowing engine being provided with valve mechanism for controlling the admission of steam thereto, a lever connected to said valve mechanism for varying the point of cut-off, a governor responsive to the speeds of the engine adapted to be engaged with said lever, a catch adapted to engage said lever with said governor or a stationary member, said stationary member, said governor being adapted to release said catch from said stationary member when the governor assumes an extreme position.

In testimony whereof I affix my signature in presence of two witnesses.

JAMES TRIBE.

Witnesses:
WILLIAM SCHLUETER,
G. F. DE WEIN.